(12) United States Patent
Scholte-Wassink et al.

(10) Patent No.: US 9,404,478 B2
(45) Date of Patent: Aug. 2, 2016

(54) METHODS AND SYSTEMS FOR OPERATING A WIND TURBINE IN NOISE REDUCED OPERATION MODES

(75) Inventors: Hartmut Scholte-Wassink, Lage (DE); Saskia Honhoff, Salzbergen (DE); Benoit Petitjean, Rheine (DE)

(73) Assignee: General Electric Company, Schenectady, NY (US)

( * ) Notice: Subject to any disclaimer, the term of this patent is extended or adjusted under 35 U.S.C. 154(b) by 791 days.

(21) Appl. No.: 13/454,731

(22) Filed: Apr. 24, 2012

(65) Prior Publication Data

US 2013/0280066 A1   Oct. 24, 2013

(51) Int. Cl.
*F03D 7/02* (2006.01)
*F03D 7/04* (2006.01)

(52) U.S. Cl.
CPC ............ *F03D 7/0296* (2013.01); *F03D 7/0224* (2013.01); *F03D 7/0244* (2013.01); *F05B 2260/96* (2013.01); *F05B 2270/323* (2013.01); *F05B 2270/333* (2013.01); *Y02E 10/723* (2013.01)

(58) Field of Classification Search
USPC ..................................... 415/1, 118; 416/1, 64
See application file for complete search history.

(56) References Cited

U.S. PATENT DOCUMENTS

| | | | |
|---|---|---|---|
| 7,023,105 B2 * | 4/2006 | Wobben | 290/44 |
| 7,692,322 B2 * | 4/2010 | Wakasa et al. | 290/44 |
| 7,883,317 B2 * | 2/2011 | Ormel et al. | 416/1 |
| 7,902,689 B2 * | 3/2011 | Kinzie et al. | 290/55 |
| 8,215,907 B2 * | 7/2012 | Kooijman | F03D 7/0212 416/1 |
| 2008/0001409 A1 * | 1/2008 | Schellings | 290/44 |
| 2009/0317250 A1 * | 12/2009 | Gamble et al. | 416/1 |
| 2010/0133818 A1 * | 6/2010 | Kinzie et al. | 290/44 |
| 2010/0135798 A1 * | 6/2010 | Eggleston | 416/36 |
| 2010/0143121 A1 * | 6/2010 | Haans et al. | 416/1 |
| 2012/0051907 A1 * | 3/2012 | Rogers et al. | 416/1 |
| 2012/0189443 A1 * | 7/2012 | Esbensen et al. | 416/1 |
| 2013/0101413 A1 * | 4/2013 | Esbensen et al. | 416/1 |
| 2013/0280066 A1 * | 10/2013 | Scholte-Wassink et al. | 416/1 |

* cited by examiner

*Primary Examiner* — Igor Kershteyn
*Assistant Examiner* — Christopher R Legendre
(74) *Attorney, Agent, or Firm* — Douglas D. Zhang; GE Global Patent Operation

(57) ABSTRACT

According to the present disclosure, a method of operating a wind turbine including operating the wind turbine in a noise reduction mode based on at least one set point of a wind turbine parameter such that noise produced by said wind turbine remains below a predefined noise emission level, obtaining an actual air density related value, and applying a correction factor to the at least one set point of a wind turbine parameter is provided. The correction factor is determined in dependence of said actual air density related value.

20 Claims, 5 Drawing Sheets

METHODS AND SYSTEMS FOR OPERATING A WIND TURBINE IN NOISE REDUCED OPERATION MODES

BACKGROUND OF THE INVENTION

The subject matter described herein relates generally to methods and systems for wind turbines, and more particularly, to methods and systems for operating a wind turbine in noise reduced operation modes in an efficient manner.

Energy generated from wind, for example, through the use of large scale wind turbines has experienced rapid growth in recent years. Source of this growth may be the numerous environmental, technical and economic benefits related to wind generated energy production. Wind energy is widely available, renewable and reduces the production of greenhouse gases by diminishing the need of fossil fuels as energy source. Furthermore, improvements in design, manufacturing technologies, materials and power electronic devices of wind turbines has and will in the future continue to decrease production costs of wind turbines while increasing their energy production capabilities and efficiencies.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generators to generate electricity.

In general, during operation wind turbines generate acoustic emissions in the form of audible noise measured in decibels (dB). Such noise may be of a mechanical or aerodynamic origin. Often, local regulatory levels may limit the allowable noise emission levels of a wind turbine or a wind turbine installation including a plurality of wind turbines (i.e., a wind park), especially, in cases where the wind turbine or wind park operates close to or in a densely populated area.

Generally, the noise from mechanical origin, which is caused by gears and bearings, has been reduced considerably over the past years, for instance by proper sound insulation and is therefore becoming less of a concern. However, in order to further reduce wind turbine noise, focus is now placed on reducing the aerodynamic noise produced by wind turbines.

Normally, aerodynamic noise is produced by the rotational movement of the rotor blades through air, for instance by the tip vortex noise that forms in the noise generation process on the outer part of the wind turbine blades. Reducing noise, which originates from the aerodynamic effects of a wind turbine, may be achieved, for instance, by optimizing the blade design (e.g., airfoil shape and materials used).

However, since noise generation has not yet been fully eliminated during the operation of a wind turbine, sound power management (SPM) of wind turbines has become a significant criterion, for instance, for site planning permission and acceptance of wind turbines while new projects are developed. To meet local regulatory levels of noise emission individual wind turbines or wind parks may also be operated partly (e.g., by night), or continuously in noise reduced operation (NRO) modes.

Typically, NRO modes and SPM schemes include predetermined set points of wind turbine parameters that generally determine the rotor speed and thus affect tip speed. For example, changing the pitch angle set point of one or more rotor blades of a wind turbine may change the rotor speed. Usually, simulation tools are used to produce values for the aforementioned set points.

To achieve certain noise emission levels NRO modes and SPM schemes of operation of wind turbines usually reduce the rotor speed. In general, this reduction in rotor speed implies that wind turbines generate electric power below their maximum possible power generation capacity at the present site conditions (especially wind speed). This results in considerable losses in annual energy production (AEP). However, such losses are often the compromise to get permission by local authorities for the wind turbine installation. On that account, it will be appreciated that in order to maximize AEP yields of wind turbines functioning in NRO modes and/or with SPM schemes the maximum capacity of a wind turbine for generating electric power and operating within such modes and/or schemes should be approached.

Hence, the subject matter described herein pertains to methods and systems that enable the aforementioned optimization of NRO modes and SPM schemes, which ensures that wind turbines extract the maximum amount of power from wind energy when operating under specific noise emission constraints.

BRIEF DESCRIPTION OF THE INVENTION in one aspect, a method of operating a wind turbine including operating the wind turbine in a noise reduction mode based on at least one set point of a wind turbine parameter such that noise produced by said wind turbine remains below a predefined noise emission level, obtaining an actual air density related value, and applying a correction factor to the at least one set point of a wind turbine parameter is provided. The correction factor is determined in dependence of the actual air density related value.

In another aspect, a control system for use in a wind turbine, the wind turbine including a rotor being adapted to rotate with a rotor speed, the control system including at least one adjustment system for adjusting the rotor speed of the wind turbine and at least one processor coupled to the at least one adjustment system is provided. The at least one processor is programmed for operating the wind turbine in a noise reduction mode based on at least one set point of a wind turbine parameter such that noise produced by said wind turbine remains below a predefined noise emission level, obtaining an actual air density related value, applying a correction factor to the at least one set point of a wind turbine parameter, and controlling the at least one adjustment system based on the at least one set point of a wind turbine parameter. The correction factor is based on the actual air density related value.

Furthermore, the control system is configured to perform the method of operating a wind turbine in a noise reduction mode as disclosed herein.

In another aspect, a wind turbine including a nacelle supported by a tower, at least one rotor supported by the nacelle and adapted to rotate with a rotor speed, and a control system is provided. The control system includes at least one adjustment system for adjusting the rotor speed of the wind turbine and at least one processor coupled to the at least one adjustment system. The processor is programmed for operating the wind turbine in a noise reduction mode based on at least one set point of a wind turbine parameter such that noise produced by said wind turbine remains below a predefined noise emission level, obtaining an actual air density related value, applying a correction factor to the at least one set point of a wind turbine parameter, and controlling the at least one adjustment system based on the at least one set point of a wind turbine parameter. The correction factor is determined in dependence of the actual air density related value.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Figure 1:
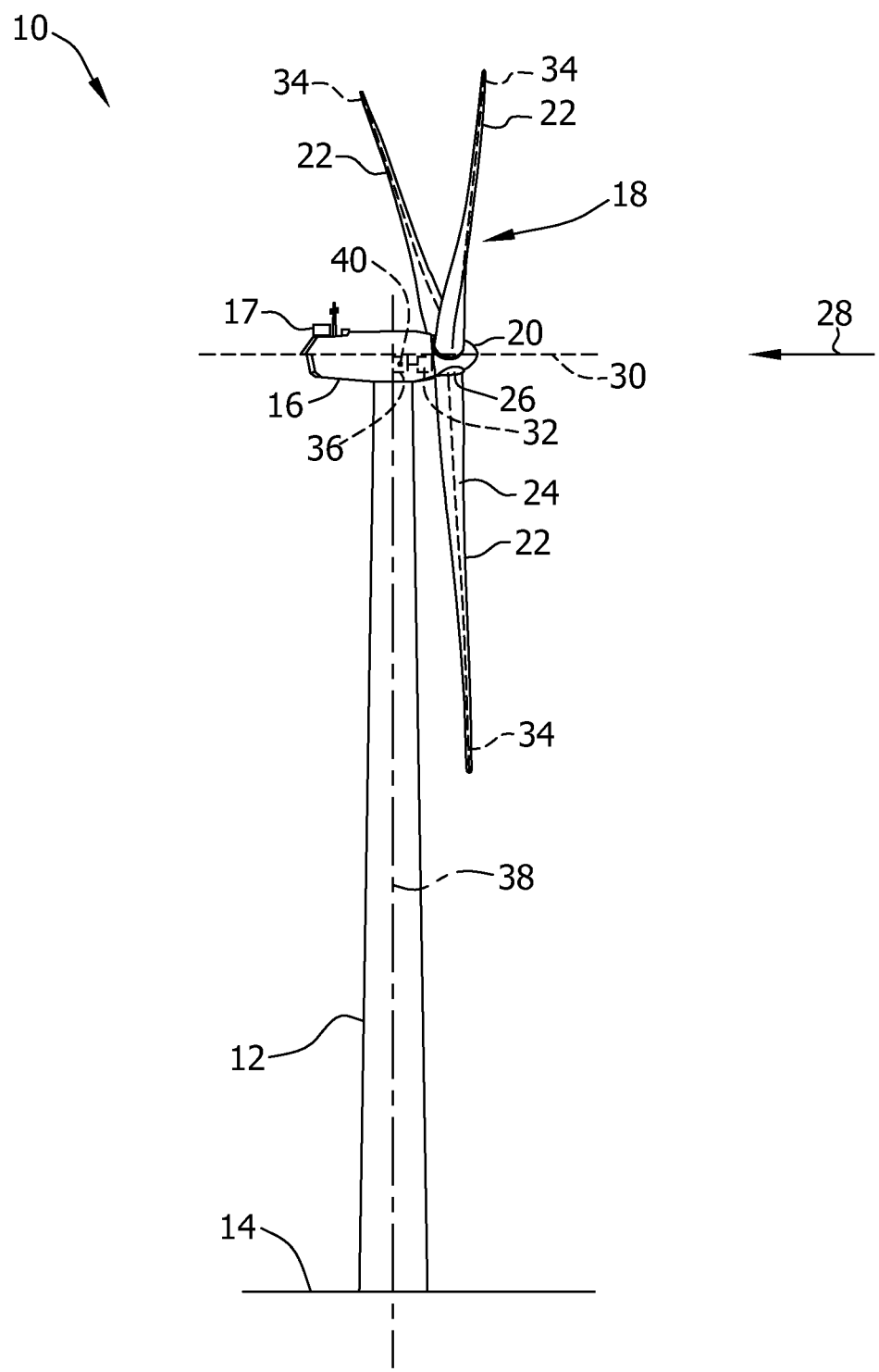
FIG. 1 is a perspective view of an exemplary wind turbine.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

As used herein, the term "site of installation" is intended to be representative of the site at which a wind turbine is installed. Further the site of installation may include the site of installation of a plurality of wind turbines, e.g., in a wind park. Furthermore the site of installation may be representative of an area up to 500 m around a wind turbine or outside of a wind park.

As used herein, the term "actual air density related value" is intended to be representative of an actual air density value present at the site of installation of a wind turbine. Further, the actual air density related value is also intended to be representative of a value of an environmental variable used to determine the actual air density value present at the site of installation of a wind turbine. Furthermore, the actual air density related value may be estimated based on local conditions. Alternatively or in addition thereto, estimated local conditions may be combined with the measurement of an environmental variable at the site of installation of the wind turbine to determine the actual air density related value.

As used herein, the term "sensor system" is intended to be representative of any type of sensor system, which may include one or more devices, for instance, sensors that are capable of measuring environmental variables such as temperature, air pressure and humidity. Further, an air density sensor system may be representative of a device that is capable of directly determining the air density related value.

As used herein, the term "correction factor" is intended to be representative of a factor based on the actual air density related value that may be implemented, for instance, by a processor to adjust the at least one NRO mode or SPM scheme set point of a wind turbine parameter, for instance, such that the power yield of the wind turbine operating in a noise reduction mode is maximized.

As used herein, the term "adjustment system" is intended to be representative of at least one adjustment system, which is adapted to adjust at least one wind turbine parameter such as, for instance, the pitch angle (e.g., full-span blade or partial span blade pitch angle) of at least one rotor blade or the generator torque.

As used herein, the term "noise reduction mode" is intended to be representative of a wind turbine operation mode in which the noise emission from the wind turbine is at or below a specified noise emission level. NRO modes and SPM schemes may be representative of such noise reduction modes.

Processors described herein process information transmitted from a plurality of electrical and electronic devices that may include, without limitation, sensors, actuators, compressors, and further, control, monitoring, adjusting and sensor systems. Such processors may be physically located in, for example, a control or adjusting system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

In the exemplary embodiments, a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions by, for example the control system as described herein. In one embodiment, the controller may be a microprocessor that includes read-only memory (ROM) and/or random access memory (RAM), such as, for example, a 32 bit microcomputer with 2 Mbit ROM, and 64 Kbit RAM. As used herein, the term "real-time" refers to outcomes occurring in a substantially short period of time after a change in the inputs affect the outcome, with the time period being a design parameter that may be selected based on the importance of the outcome and/or the capability of the system processing the inputs to generate the outcome.

The embodiments described herein include a wind turbine method and system that enables optimizing the noise reduced operation modes of a wind turbine, thereby ensuring the maximum power capture of the wind turbine within an acceptable noise limit. More specifically, using air density data, for instance, an actual air density related value to supplement NRO modes and SPM schemes enables a more accurate adjustment of the set point of a wind turbine parameter. The aforementioned set point of a wind turbine may, for instance, be the rotor pitch angle and generator torque set points. Hence, adjusting the aforementioned set points of a wind turbine parameter may effectively maximize the power capture of the wind turbine operating within certain noise constraints.

Commonly, wind turbines located in urbanized areas often function under reduced power production during the night to conform to local noise limits. NRO modes and SPM schemes are often set by the wind turbine manufacturers based on standard noise curves. Typically, noise limited modes corresponds in many cases to a limitation of the tip speed (rotor rpm) by an adjustment of the pitch angle of one or more rotor blades. For a particular noise level, typically, the rated power of all the noise limited modes will be the same. Consequentially, losses in captured energy occur during such operation modes, which affect the AEP of a wind turbine.

Generally, the noise produced by a wind turbine is dependent on the air density, such that the produced noise increases with increasing air density. It follows that under lower air density values the noise produced is typically lower. As described above, wind turbines operating in NRO modes or with SPM schemes typically use predetermined set points of wind turbine parameters. These set points usually have been determined by the manufacturer at one particular altitude and under simulated conditions.

For instance, a wind turbine may operate in a noise reduced mode with parameter settings of the wind turbine determined by the manufacturer based on standard noise curves. However, since the air density at sea level sites or on hot days may be low, consequentially, the noise produced by the wind turbine may be below the noise level predicted by the standard noise curves used by the manufacturer to set the parameter set points of the wind turbine. Hence, the wind turbine would in fact operate below the allowable noise limit. Applying a correction factor based on the air density at the site of installation of the wind turbine may, for instance, enable the wind turbine to be operated in a NRO mode or with a SPM scheme using an increased rotor speed and still meet the imposed noise requirements. For this purpose, applying the correction factor may be representative of a process whereby at least one set point of a wind turbine parameter is adjusted in dependence of an air density related value such that the power yield of the wind turbine operating in a noise reduction mode is maximized.

In view of the above, more energy may be produced when operating a wind turbine in NRO modes or with SPM schemes under consideration of the air density such that the AEP and profitability of the wind turbine may be increased. Further advantages may arise, for instance, that in Cold Weather Extreme (CWE) sites the noise limits may be better tracked at very cold days and for high altitude sites where the density is permanently low, the power capture of a wind turbine may be lastingly increased.

In some embodiments described herein, a correction factor may be applied to the NRO and/or SPM set points based on an air density related value. The air density related value may be derived from measurements or estimated based on local conditions or combinations of these (e.g., measure the temperature but base the pressure on the site altitude). For this purpose, a sensor system may be operationally coupled to a wind turbine. The sensor system may include devices such as, hygrometers, pressure gauges and thermometers (that measure humidity, temperature and pressure, respectively) to provide values of environmental variables. These values enable the determination of the air density related value. Alternatively or in addition thereto, the sensor system may directly provide an actual air density value.

Further, the sensor system may be mounted on the nacelle or on the support system of the wind turbine. Alternatively or in addition thereto, the sensor system may be positioned in close proximity to a wind park (e.g., on a measurement mast in the wind park or less than 500 m outside the wind park).

The sensor system may include at least one device, which may, for example, be a smart sensor capable of autonomously detecting a change in the value of an environmental variable used to obtain the air density related value. The smart sensor may operate under a continuous or periodic monitoring scheme. For instance, in the continuous monitoring scheme, the smart sensor may transmit a new value of an environmental variable only when a predetermined threshold value of the newly measured environmental variable is exceeded. Alternatively or in addition thereto, the smart sensor may also transmit a new value of an environmental variable when the difference between the new value of an environmental variable and the value of the environmental variable that was previously transmitted is greater than a predetermined threshold. In the periodic scheme, the smart sensor may also transmit the value of an environmental variable after predetermined time intervals. Alternatively or in addition thereto, the periodic and continuous monitoring schemes may also be combined with each other.

The data transmission from the sensor system to, for instance, a control system of the wind turbine may occur in real time and over hardwired electrical connections or via a wireless network. The wind turbine control system may use the information from the sensor system to apply a correction factor to the NRO and/or SPM set points based on an air density related value. The optimized NRO and/or SPM wind turbine set points may, for instance, increase the rotor speed of a wind turbine such that more wind energy may be captured.

The above-described systems and methods, which include using a correction factor based on an air density related value to adjust the NRO and SPM set points of at least one wind turbine parameter, are especially advantageous since they enable an additional energy capture of a wind turbine operating at noise constrained sites. Further, the advantage of additional energy capture arises in environments with a dynamic air density, which may fluctuate over the day or seasonally. For instance, at sea level sites the air density may vary greatly depending on air humidity and temperature such that the above-mentioned optimization of wind turbine set points may occur numerous times during the operation of the wind turbine in a NRO mode or with a SPM scheme (i.e., numerous times per day).

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 12 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control or adjustment system can also include memory, input channels, and/or output channels.

According to embodiments described herein, wind turbine 10 may be equipped with or operatively coupled to a sensor system for measuring and/or obtaining values of environmental variables related to air density such as, for instance, temperature, air pressure and humidity. Alternatively or in addition thereto, a sensor system may be adapted to directly obtain an air density related value. Further, the sensor system may include separate measuring devices for measuring the aforementioned environmental variables (e.g., thermometers, hygrometers and pressure gauges).

In embodiments described herein, air density sensor system 17 is representative of such a sensor system and may be provided close to or mounted directly on wind turbine 10. A single air density sensor system 17 or an equivalent device adapted to directly obtain an air density related value may be operatively coupled to more than one wind turbine, i.e. to provide values of environmental variables or of an air density related value to multiple wind turbines, for instance, in a wind park.

Typically, the air density sensor system 17 may be operatively coupled to a control system, which may be capable of receiving values of environmental variables or of an air density related value. Further, the control system may adjust the set points of NRO modes or SPM schemes of at least one parameter of wind turbine 10 according to the received values of the environmental variables or of the air density related value.

For instance, in the embodiments described herein, control system 36 may be such a control system, which may be capable of receiving information from the air density sensor system 17. Further, control system 36 may receive some of the values of the environmental variables required to determine an air density related value, such as an air pressure value, from close by weather stations (not shown in the figures). For this purposes, control system 36 may be in communication with the weather station via electrical connections or a wireless system (not shown in the figures). Alternatively or in addition thereto, control system 36 may be capable of estimating at least one value of an environmental variable based on local conditions.

The weather station and/or the air density sensor system 17 may communicate periodically (e.g., after a predetermined amount of time has lapsed) with control system 36 or only when a predetermined change in one of the values of the environmental variables or the value corresponding to an air density related value has occurred (i.e., continuously). In the latter case, the air density sensor system 17 may possess at least a limited intelligence, for example, in the form of at least one processor that is capable to compute and decide when such predetermined change in a value of the environmental variables or an air density related value has occurred. Further, control system 36 and the air density sensor system 17 may communicate through, but are not limited to, electrical connections and/or a wireless system (not shown in the figures).

Figure 2:
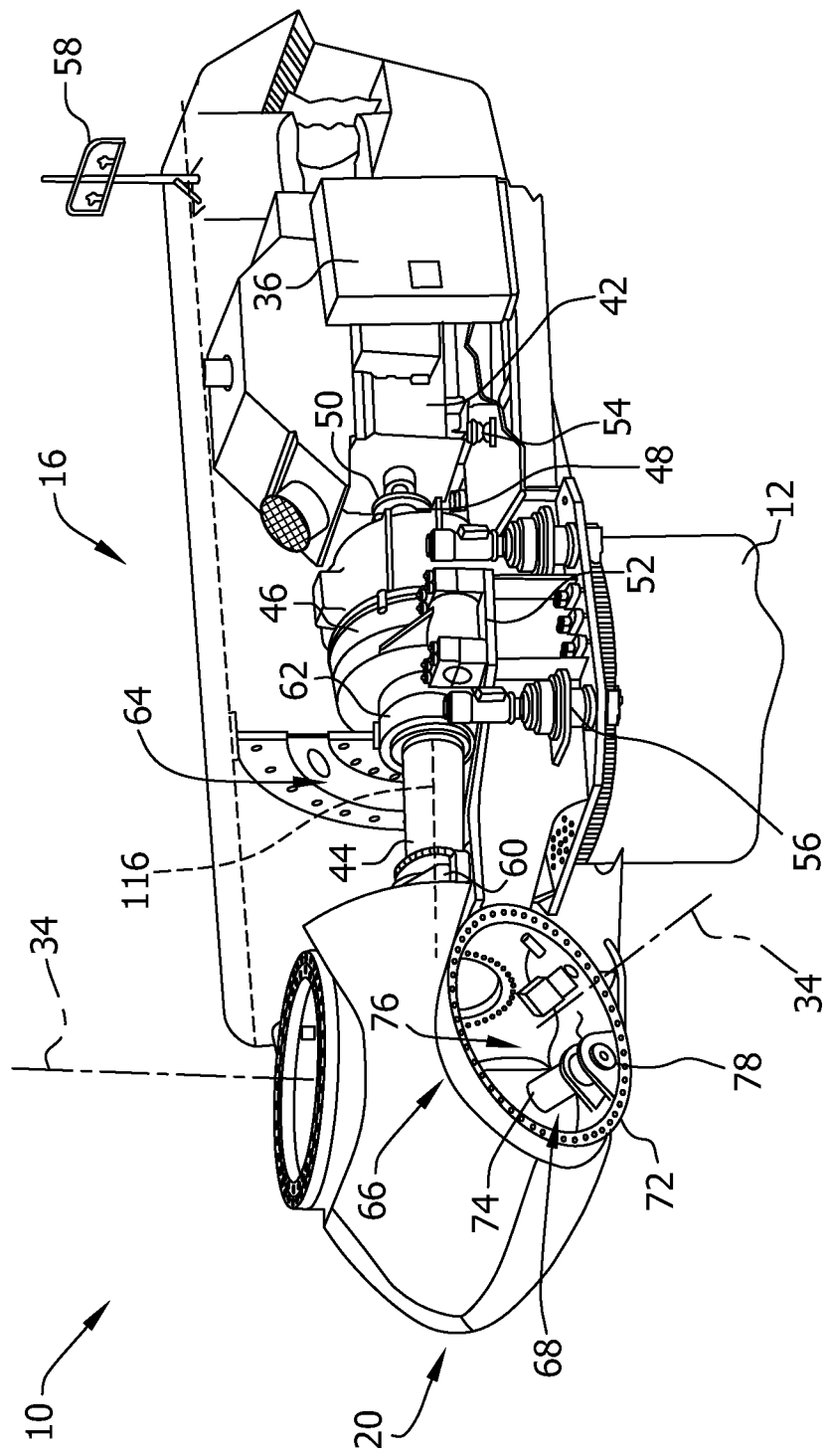
FIG. 2 is an enlarged sectional view of a portion of the wind turbine shown in FIG. 1 indicating the position of a sensor system according to embodiments herein.

FIG. 2 is an enlarged sectional view of a portion of wind turbine 10. In the exemplary embodiment, wind turbine 10 further includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shall 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary, embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

In the exemplary embodiment, each pitch drive system 68 includes at least one pitch drive motor 74. Pitch drive motor 74 is any electric motor driven by electric power that enables pitch drive system 68 to function as described herein. Alternatively, pitch drive system 68 include any suitable structure, configuration, arrangement, and/or components such as, but not limited to, hydraulic cylinders, springs, and servomechanisms. Moreover, pitch drive system 68 may be driven by any suitable means such as, but not limited to, hydraulic fluid, and/or mechanical power, such as, but not limited to, induced spring forces and/or electromagnetic forces.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electric power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/ or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Figure 3:
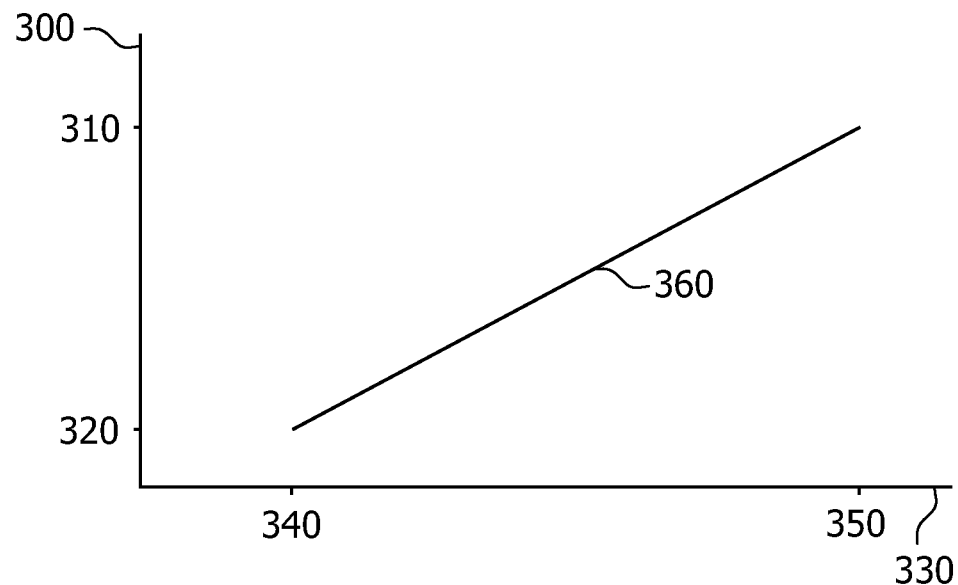
FIG. 3 is schematic graphical representation of the simulated relationship between the noise produced by a wind turbine and the air density.

According to embodiments herein, FIG. 3 shows the relationship, obtained via simulation, between the noise produced by a wind turbine and the air density. The pressure and temperature were varied to obtain simulations at different air densities. In general, and whilst taking into account low order effects related to the viscosity of air and the speed of sound the graph shows that there is a linear relationship between noise production of a wind turbine and air density.

The following illustrates an example of a simulation according to embodiments described herein. It refers to the linear relationship depicted in FIG. 3 by line 360 between wind turbine noise 300 measured in dBA (shown on the vertical axis of FIG. 3) and air density 330 measured in kg/m$^3$ (shown on the horizontal axis of FIG. 3). A wind turbine located at a high altitude (e.g., above 1,400 m above sea level) operating at an air density value of 1.0 kg/m$^3$ and 1.1 kg/m$^3$ during the winter and summer respectively (represented as air density value 340 and 350 on FIG. 3, respectively). The noise emission values of the wind turbine corresponding to the air densities 340 and 350 are 103 dBA and 103.5 dBA respectively (represented as sound power values 320 and 310 on FIG. 3, correspondingly). The annual mean wind speed is 7.5 m/s and the wind turbine operates at night using a NRO mode or SPM scheme, whilst being under a normal mode of operation during the day. Without optimizing the NRO mode or SPM scheme of the wind turbine based on the air density related value the wind turbine makes an energy loss of 2% whilst operating in the NRO mode or under the SPM scheme.

Figure 4:
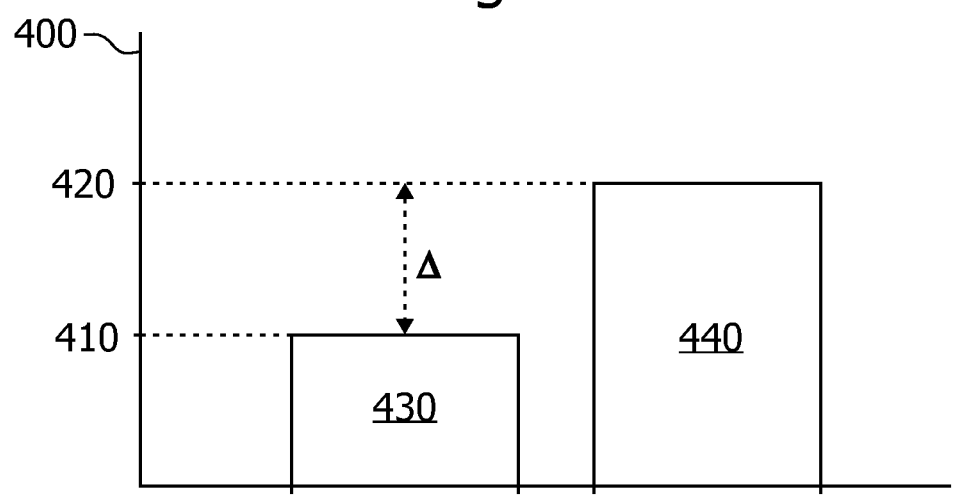
FIG. 4 is a schematic graphical representation according to embodiments described herein of the AEP of two wind turbines.

Optimizing the NRO mode or SPM scheme based on an air density related value, as is described in more detail below, reduces the aforementioned energy loss of 2% by the following percentages: during the winter by 0.4% (i.e., effective energy loss being 1.6%) and during the summer by 0.7% (i.e., effective energy loss being 1.3%). In other words, the wind turbine operating at night with the air density corrected NRO mode or SPM scheme has an additional energy yield of 0.5% of the AEP. This extra energy yield is represented in FIG. 4, which shows the AEP value 410 of a wind turbine operating without the optimized NRO mode or SPM scheme 430 and the AEP value 420 of a wind turbine operating with the optimized NRO mode or SPM scheme 440.

Figure 5:
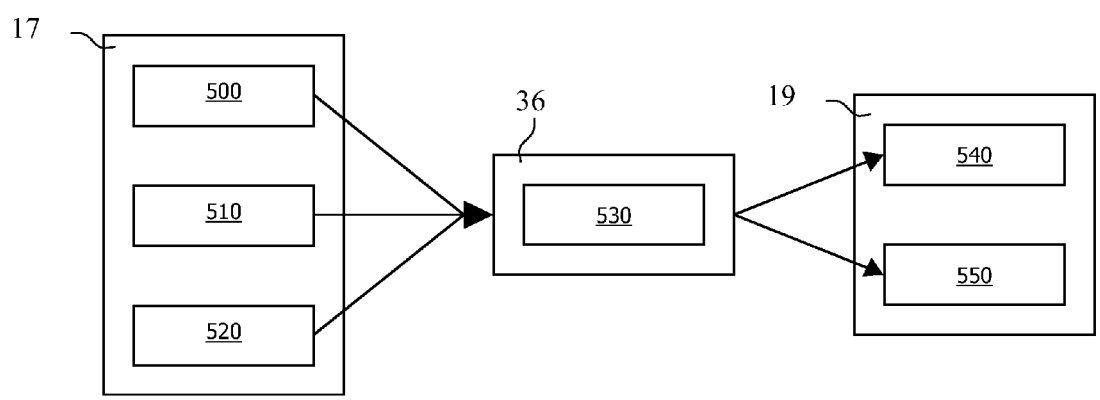
FIG. 5 is a schematic graphical representation of a scheme for the operation of a wind turbine according to embodiments described herein.

FIG. 5 is a schematic graphical representation of a scheme for operation of a wind turbine according to embodiments described herein. As schematically represented, a control system 36 may obtain values of environmental variables from an air density sensor system 17. These may, for example, include temperature value 500, air pressure value 510 and humidity value 520 values expressed in raw or engineering units. Alternatively or in addition thereto, control system 36 may directly obtain an air density value.

Generally, control system 36 includes processor 530, which may be adapted to operate wind turbine 10 (shown in FIG. 1) in a NRO mode or with a SPM scheme. Typically, processor 530 may regulate the operation of wind turbine 10 in the aforementioned modes by controlling at least one of the wind turbine adjustment systems 19. Wind turbine adjustment systems 19 may include one or more separate adjustment systems such as, for example, a pitch adjustment system 540 that enables the adjustment of the pitch angle of rotor blades 22 along axis 34 (shown in FIG. 1) and a torque adjustment system 550 that enables the adjustment of the torque of the electric generator 42 (shown in FIG. 2). The adjustment systems 19 are not limited to the above-mentioned examples but may include further adjustment systems (not shown in the figures) that are capable of changing wind turbine parameters such as, for example, an azimuth adjustment system adapted for positioning the nacelle in relation to the tower into the wind direction that is best for energy conversion under consideration of noise constraints and air density. Furthermore, in the embodiments described herein adjustment systems 19 may be considered to be part of control system 36.

Typically, processor 530 may be capable of processing the measured values of environmental variables from air density sensor system 17 to obtain an air density related value. Generally, such processing or calculations are based on actual values of measured environmental variables (e.g., temperature, air pressure and humidity). However, processor 530 may also estimate the air density related value based on local conditions. Alternatively or in addition thereto, processor 530 may combine measured values of environmental variables with estimated values of environmental variables based on local conditions to obtain an air density related value.

Figure 6:
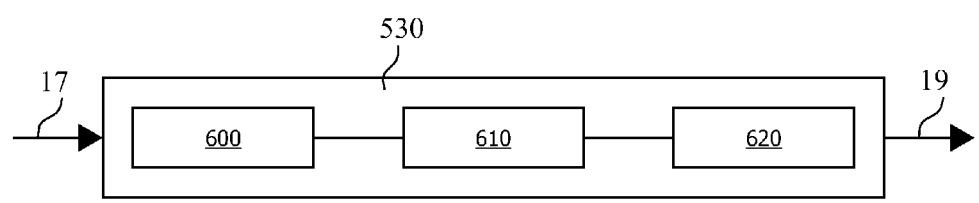
FIG. 6 is a more detailed schematic graphical representation of a scheme for the operation of a wind turbine shown in FIG. 5 according to embodiments described herein.

FIG. 6 is a more detailed schematic graphical representation of the scheme shown in FIG. 5 for operating a wind turbine according to embodiments described herein. Typically, processor 530 may use a correction algorithm 600 that uses information from the air density sensor system 17 (e.g., temperature, air pressure and humidity) in order to obtain a correction factor 610. Alternatively or in addition thereto, processor 530 may use an air density related value in order to obtain a correction factor 610 via correction algorithm 600. Further, processor 530 may apply correction factor 610 to adjust at least one set point 620 of a wind turbine NRO mode or SPM scheme. Furthermore, processor 530 may communicate the corrected set points to a respective adjustment system 19, which adjusts the corresponding wind turbine parameters accordingly.

Exemplarily, after adjusting the pitch angle set point by applying the correction factor 610, processor 530 may instruct pitch adjustment system 540 (shown in FIG. 5) to adjust the pitch angle of rotor blades 22 along axis 34 based on the adjusted pitch angle set point. Pitch adjustment system 540, which may include a pitch drive system 68 with a pitch drive motor 74 (both of which are shown in FIG. 2) for each rotor blade 22, may consequentially adjust the pitch angle of the respective rotor blades 22 along axis 34.

Not limited to one particular embodiment described herein, the correction factor may further be based on data from variables such as, for instance, the wind speed gradient, temperature gradient and/or the sound transmission in air, which are related and may change with the air density.

The aforementioned scheme shown in FIG. 5 and FIG. 6 may occur before the wind turbine switches to a NRO mode or before operating with a SPM scheme. Alternatively or in addition thereto, the scheme shown in FIG. 5 and FIG. 6 and described in more detail above, may be initiated more than once and at any time whilst a wind turbine is operating in a NRO mode and/or with a SPM scheme.

Generally, the at least one set point 620 adjusted by the correction factor based on an air density related value enables a wind turbine operating in a NRO mode or with a SPM scheme to increase its maximum power capture while the noise produced by the same wind turbine remains within the limits of the allowable local noise levels. In other words the wind turbine may, for instance, operate with an increased rotor tip speed whilst remaining within the noise constraints.

Figure 7:
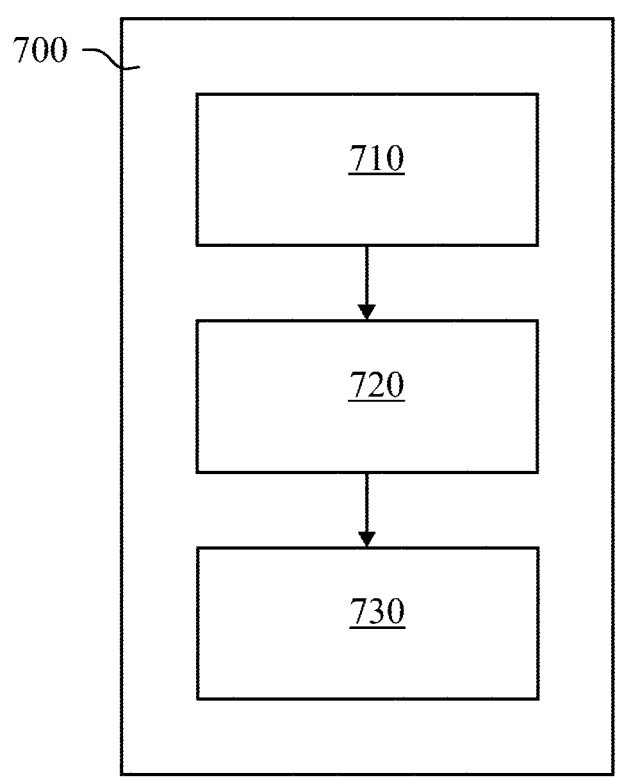
FIG. 7 is a block-diagram according to embodiments herein showing a method for operating a wind turbine in a noise reduced operation mode.

FIG. 7 is a flow chart of a method 700 of operating a wind turbine in a NRO mode or with a SPM scheme under consideration of the air density. Typically, the method includes operating a wind turbine in a noise reduction mode based on at least one set point of a wind turbine parameter, as depicted in block 710 of FIG. 7. In block 720 an air density related value may be obtained, for instance, by a sensor system 17 (see FIG. 5). Finally, in block 730 a correction factor may be applied to the at least one set point of a wind turbine parameter. The correction factor is determined in dependence of the air density related value.

The above-described systems and methods facilitate controlling the area of knurl formation of at least one cable or cable bundle. More specifically, controlling the twisting of cables, which are routed from the nacelle into the tower of a wind turbine, prevents system malfunctions, overheating in the knurls and movement of the knurls to other parts in the tower. Additionally, system safety may be increased and excessive wear of the at least one cable or cable bundle as well as wear on surrounding structures, such as, for example, ladders or lights may be reduced.

Exemplary embodiments of systems and methods for operating a wind turbine in a NRO mode or with a SPM scheme under consideration of an air density related value at the site of installation of the wind turbine are described above in detail. The systems and methods are not limited to the specific embodiments described herein, but rather, components of the systems and/or steps of the methods may be utilized independently and separately from other components and/or steps described herein. For example, operating a wind turbine in such an optimized NRO mode or SPM scheme may be employed in other wind turbines, for example vertical wind turbines, other power generating machines or devices employing a NRO mode or SPM scheme, and are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a wind turbine, comprising:
providing said wind turbine with a plurality of noise reduction modes, each of the noise reduction modes comprising a given fixed rated power at a given fixed air density that corresponds to a plurality of set points of a wind turbine parameter predetermined by simulation such that noise produced by said wind turbine remains below a predefined noise emission level;

obtaining an actual air density related value;

determining a correction factor based on a difference between the given fixed air density and the actual air density related value;

applying the correction factor to each of the noise reduction modes to update said plurality of set points of said wind turbine parameter predetermined by simulation; and operating said wind turbine in the plurality of corrected noise reduction modes at different rated powers based on the plurality of corrected set points.

2. The method according to claim 1, wherein applying said correction factor to said plurality of set points of said wind turbine parameter includes applying said correction factor to at least one set point of said wind turbine parameter chosen from: a pitch angle set point and a generator torque set point.

3. The method according to claim 1, wherein obtaining an actual air density related value includes computing an actual air density value present at a site of installation of said wind turbine.

4. The method according to claim 1, wherein said actual air density related value includes measuring at least one value of an environmental variable present at a site of installation of said wind turbine.

5. The method according to claim 4, wherein measuring said at least one value of an environmental variable present at the site of installation of said wind turbine includes measuring at least one value of an environmental variable that is chosen from the list of the following elements: temperature, air pressure, and humidity.

6. The method according to claim 4, wherein measuring said at least one value of an environmental variable present at the site of installation of said wind turbine includes monitoring said at least one environmental variable using at least one of a continuous and a periodic monitoring scheme.

7. The method according to claim 1, wherein obtaining an actual air density related value includes computing said actual air density related value based on at least one value of an environmental variable estimated from local conditions, wherein said at least one value of an environmental variable estimated from local conditions is an element chosen from the following list: temperature, air density and humidity.

8. The method according to claim 1, wherein applying said correction factor to said plurality of set points of a wind turbine parameter includes computing a new actual air density related value whenever the value of at least one environmental variable has changed more than a predetermined value, wherein said value of at least one environmental variable is chosen from the list of the following elements: temperature, air pressure, and humidity.

9. A control system for use in a wind turbine, said wind turbine comprising a rotor being adapted to rotate with a rotor speed, said control system comprising:

at least one adjustment system for adjusting said rotor speed of said wind turbine; and at least one processor coupled to said at least one adjustment system, wherein said at least one processor is programmed for:

providing said wind turbine with a plurality of noise reduction modes, each of the noise reduction modes comprising given fixed rated power at a given fixed air density that corresponds to a plurality of set points of a wind turbine parameter predetermined by simulation such that noise produced by said wind turbine remains below a predefined noise emission level;

obtaining an actual air density related value;

determining a correction factor based on a difference between the given fixed air density and the actual air density related value;

applying the correction factor to each of the noise reduction modes to update said plurality of set points of said wind turbine parameter predetermined by simulation; and controlling said at least one adjustment system to adjust said rotor speed of said wind turbine to operate the plurality of corrected wind turbine modes at different rated powers based on said plurality of corrected set points.

10. The control system according to claim 9, wherein said plurality of set points of said wind turbine parameter are chosen from a pitch angle set point and a generator torque set point.

11. The control system according to claim 9, wherein said at least one adjustment system for adjusting said rotor speed of said wind turbine is chosen from: a torque adjustment system coupled to said wind turbine generator and a pitch adjustment system coupled to a rotor blade.

12. The control system according to claim 9, wherein said at least one processor is further coupled to a sensor system that monitors at least one value of an environmental variable chosen from the list of the following elements: temperature, air pressure, and humidity.

13. A wind turbine comprising:

a nacelle supported by a tower, at least one rotor supported by said nacelle and adapted to rotate with a rotor speed, and a control system, wherein said control system comprises:

at least one adjustment system for adjusting the rotor speed of said wind turbine; and at least one processor coupled to said at least one adjustment system, wherein said at least one processor is programmed for:

providing said wind turbine with a plurality of noise reduction modes, each of the noise reduction modes comprising a given fixed rated power at a given fixed air density that corresponds to a plurality of set points of a wind turbine parameter predetermined by simulation such that noise produced by said wind turbine remains below a predefined noise emission level;

obtaining an actual air density related value;

determining a correction factor based on a difference between the given fixed air density and the actual air density related value;

applying the correction factor to each of the noise reduction modes to update said plurality of set points of said a-wind turbine parameter predetermined by simulation; and controlling said at least one adjustment system to adjust said rotor speed of said wind turbine to operate the plurality of corrected noise reduction modes at different rated powers based on said plurality of corrected set points of said wind turbine parameter.

14. The wind turbine according to claim 13, wherein said at least one adjustment system for adjusting the rotor speed of said wind turbine includes at least one chosen from: a pitch angle adjustment system and a generator torque adjustment system.

15. The wind turbine according to claim 13, wherein said plurality of set points of said wind turbine parameter are chosen from a pitch angle set point and a generator torque set point.

16. The wind turbine according to claim 13, further including at least one sensor system that monitors at least one value of an environmental variable that is an element chosen from the following list: temperature, air pressure, and humidity.

17. The wind turbine according to claim 16, wherein said at least one sensor system is mounted on the nacelle of said wind turbine.

18. The wind turbine according to claim 16, wherein said at least one sensor system is mounted on a support system of said wind turbine.

19. The wind turbine according to claim 16, wherein said sensor system comprises at least one element chosen from following list: a thermometer for measuring temperature, a pressure gauge for measuring pressure, and a hygrometer for measuring humidity.

20. The wind turbine according to claim 16, wherein said sensor system includes a wireless network for transmitting information to said at least one processor.

\* \* \* \* \*